US012682083B2

(12) United States Patent
Tonoyan et al.

(10) Patent No.: US 12,682,083 B2
(45) Date of Patent: Jul. 14, 2026

(54) CRYPTOSYSTEM MIGRATION FOR SECURE BOOT SEQUENCES

(71) Applicant: NVIDIA Corporation, Santa Clara, CA (US)

(72) Inventors: Smbat Tonoyan, Los Gatos, CA (US); Paul Lee Chou, Santa Clara, CA (US); Mark Alan Overby, Snohomish, WA (US); James Jiayuan Zhang, San Jose, CA (US); Jay S. Huang, Sunnyvale, CA (US); Aishwarya Senthilkumar, Oddanchatram (IN); Mukul Singhal, Hyderabad (IN)

(73) Assignee: NVIDIA Corporation, Santa Clara, CA (US)

( * ) Notice: Subject to any disclaimer, the term of this patent is extended or adjusted under 35 U.S.C. 154(b) by 138 days.

(21) Appl. No.: 18/495,745

(22) Filed: Oct. 26, 2023

(65) Prior Publication Data

US 2025/0139256 A1 May 1, 2025

(51) Int. Cl.
*G06F 21/60* (2013.01)

(52) U.S. Cl.
CPC .................................. *G06F 21/602* (2013.01)

(58) Field of Classification Search
CPC .............................................. G06F 21/60–629
See application file for complete search history.

(56) References Cited

U.S. PATENT DOCUMENTS

| | | | |
|---|---|---|---|
| 2015/0058979 A1* | 2/2015 | Peeters | G06F 21/575 |
| | | | 726/22 |
| 2015/0365241 A1* | 12/2015 | Vlot | H04L 9/3247 |
| | | | 713/158 |
| 2017/0060595 A1* | 3/2017 | Keidar | H04L 9/30 |
| 2017/0359171 A1* | 12/2017 | Haridas | G06F 21/57 |
| 2018/0204009 A1* | 7/2018 | Xu | G06F 8/71 |
| 2023/0273977 A1* | 8/2023 | Marando | G06F 21/10 |
| | | | 726/26 |

FOREIGN PATENT DOCUMENTS

| | | | |
|---|---|---|---|
| FR | 2751771 A1 * | 1/1998 | G07F 7/1008 |

* cited by examiner

*Primary Examiner* — Madhuri R Herzog
(74) *Attorney, Agent, or Firm* — Lowenstein Sandler LLP

(57) ABSTRACT

An instruction to disable a first cryptographic key of a computing device is received by a processor of the device. The first cryptographic key is embedded in the device during manufacturing to facilitate a boot sequence of the device. The instruction is signed using a cryptographic signature. The first cryptographic key is associated with a first priority indicator. The cryptographic signature is verified using a second cryptographic key embedded in the device during manufacturing. The second cryptographic key is associated with a second priority indicator. The first priority indicator is compared with the second priority indicator. Responsive to determining that the second priority indicator supersedes the first priority indicator, the first cryptographic key is disabled.

20 Claims, 6 Drawing Sheets

RECEIVE, BY A PROCESSOR OF A DEVICE, AN INSTRUCTION TO DISABLE A FIRST CRYPTOGRAPHIC KEY EMBEDDED IN THE DEVICE DURING MANUFACTURING TO FACILITATE A BOOTING SEQUENCE OF THE DEVICE, WHEREIN THE INSTRUCTION IS SIGNED USING A CRYPTOGRAHIC SIGNATURE, AND WHEREIN THE FIRST CRYPTOGRAPHIC KEY IS ASSOCIATED WITH A FIRST PRIORITY INDICATOR 402

VERIFY THE CRYPTOGRAPHIC SIGNATURE USING A SECOND CRYPTOGRAPHIC KEY EMBEDDED IN THE DEVICE DURING MANUFACTURING, WHEREIN THE SECOND CRYPTOGRAPHIC KEY IS ASSOCIATED WITH A SECOND PRIORITY INDICATOR 404

COMPARE THE FIRST PRIORITY INDICATOR WITH THE SECOND PRIORITY INDICATOR 406

RESPONSIVE TO DETERMINING THAT THE SECOND PRIORITY INDICATOR SUPERSEDES THE FIRST PRIORITY INDICATOR, DISABLE THE FIRST CRYPTOGRAPHIC KEY 408

200

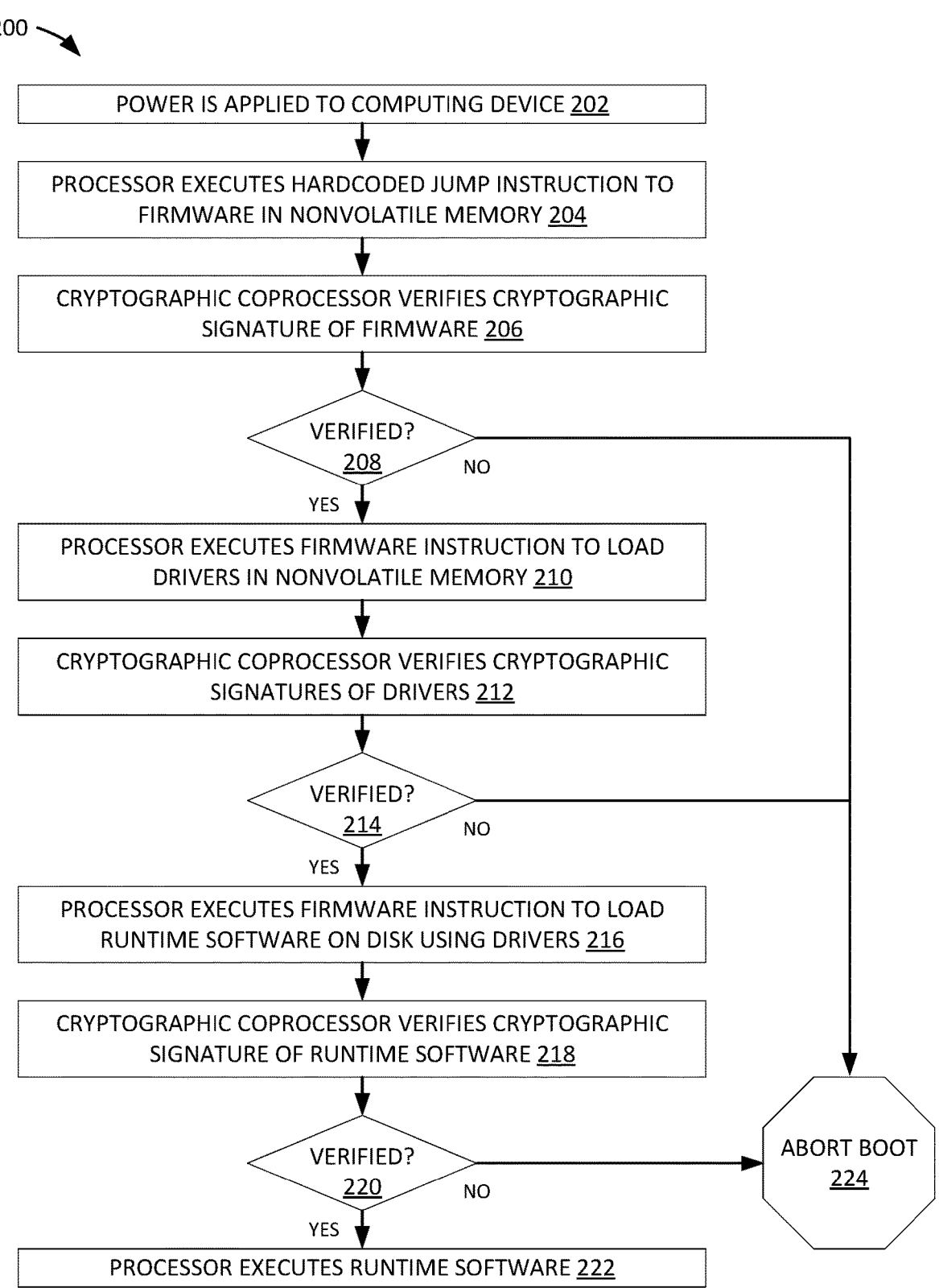

POWER IS APPLIED TO COMPUTING DEVICE 202

PROCESSOR EXECUTES HARDCODED JUMP INSTRUCTION TO FIRMWARE IN NONVOLATILE MEMORY 204

CRYPTOGRAPHIC COPROCESSOR VERIFIES CRYPTOGRAPHIC SIGNATURE OF FIRMWARE 206

VERIFIED? 208    NO

YES

PROCESSOR EXECUTES FIRMWARE INSTRUCTION TO LOAD DRIVERS IN NONVOLATILE MEMORY 210

CRYPTOGRAPHIC COPROCESSOR VERIFIES CRYPTOGRAPHIC SIGNATURES OF DRIVERS 212

VERIFIED? 214    NO

YES

PROCESSOR EXECUTES FIRMWARE INSTRUCTION TO LOAD RUNTIME SOFTWARE ON DISK USING DRIVERS 216

CRYPTOGRAPHIC COPROCESSOR VERIFIES CRYPTOGRAPHIC SIGNATURE OF RUNTIME SOFTWARE 218

VERIFIED? 220    NO

ABORT BOOT 224

YES

PROCESSOR EXECUTES RUNTIME SOFTWARE 222

FIG. 2

400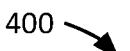

RECEIVE, BY A PROCESSOR OF A DEVICE, AN INSTRUCTION TO DISABLE A FIRST CRYPTOGRAPHIC KEY EMBEDDED IN THE DEVICE DURING MANUFACTURING TO FACILITATE A BOOTING SEQUENCE OF THE DEVICE, WHEREIN THE INSTRUCTION IS SIGNED USING A CRYPTOGRAHIC SIGNATURE, AND WHEREIN THE FIRST CRYPTOGRAPHIC KEY IS ASSOCIATED WITH A FIRST PRIORITY INDICATOR 402

VERIFY THE CRYPTOGRAPHIC SIGNATURE USING A SECOND CRYPTOGRAPHIC KEY EMBEDDED IN THE DEVICE DURING MANUFACTURING, WHEREIN THE SECOND CRYPTOGRAPHIC KEY IS ASSOCIATED WITH A SECOND PRIORITY INDICATOR 404

COMPARE THE FIRST PRIORITY INDICATOR WITH THE SECOND PRIORITY INDICATOR 406

RESPONSIVE TO DETERMINING THAT THE SECOND PRIORITY INDICATOR SUPERSEDES THE FIRST PRIORITY INDICATOR, DISABLE THE FIRST CRYPTOGRAPHIC KEY 408

FIG. 4

CRYPTOSYSTEM MIGRATION FOR SECURE BOOT SEQUENCES

TECHNICAL FIELD

Aspects and embodiments of the present disclosure relate to secure boot sequences, and in particular to cryptosystem migration for secure boot sequences.

BACKGROUND

Booting is the process of starting a computing device and loading runtime software, such as an operating system (OS) or application. Boot sequences of modern computing devices often involve multiple boot phases or stages, where each boot phase powers on, loads, verifies, configures, etc. various hardware and software aspects (including, e.g., firmware, microcode, etc.) of the device. Secure boot sequences add various authentication and security measures to the boot sequence to ensure that the device boots in the manner intended and to prevent the device from booting in undesired ways that might be introduced, e.g., by modified or malicious software or by various hardware attacks. Devices often use cryptosystems to provide secure boot sequences.

BRIEF DESCRIPTION OF DRAWINGS

Various embodiments in accordance with the present disclosure will be described with reference to the drawings, in which:

FIG. 2 is a flow diagram of an example secure boot sequence for computing devices, in accordance with at least one embodiment;

FIG. 4 is a flow diagram of a method for disabling cryptosystems of a computing device having a secure boot sequence, in accordance with at least one embodiment.

DETAILED DESCRIPTION

Figure 1:
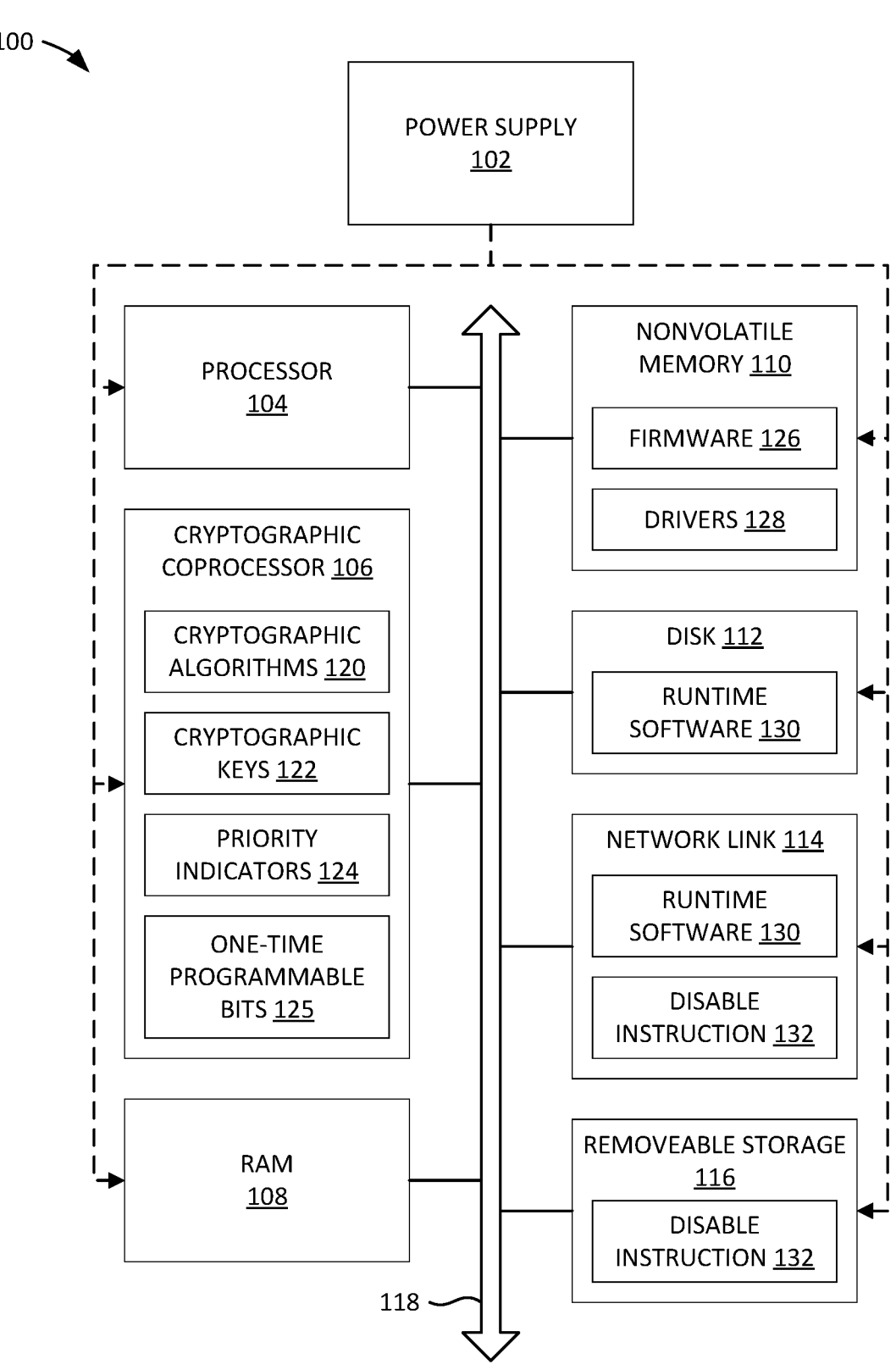
FIG. 1 is a block diagram illustrating an example computing device having a secure boot sequence in accordance with at least one embodiment.

Aspects of the present disclosure relate to cryptosystem migration for secure boot sequences. Booting is the process of starting a computing device and loading runtime software, such as an operating system (OS) or application. Boot sequences of modern computing devices often include multiple boot phases or stages, where each boot phase powers on, loads, verifies, configures, etc. various hardware and software aspects (including, e.g., firmware, microcode, etc.) of the device. Secure boot sequences add various authentication and security measures to the boot sequence to ensure that the device boots in the manner that the manufacturer (or designer, distributor, etc.) intended (e.g., with unmodified software), and to prevent the device from booting in undesired ways that might be introduced, e.g., by modified or malicious software or by various hardware attacks. Secure boot is beneficial to users of computing devices because it can protect them from potentially malicious software that may load early in the boot sequence, and it also permits end users to verify the origin and integrity of the runtime software that the computing device is running. Similarly, secure boot is beneficial to designers, manufacturers, and distributors of computing devices because it can enforce running trusted software on computing devices and can limit risks and liabilities associated with untrusted runtime software.

In conventional systems providing secure boot sequences, cryptosystems are often employed to secure and verify the integrity of the boot sequence. A cryptosystem may include one or more cryptographic algorithms and one or more cryptographic keys associated with the algorithm(s), which may be used to encrypt and decrypt data, sign and verify cryptographic signatures, or perform other cryptographic operations. For example, a computing device may include a key of an asymmetric key pair (e.g., a public key) hardcoded in a read-only memory (or similar hardware component) of the computing device during the manufacturing process. The manufacturer may possess the other key of the asymmetric key pair (e.g., a private key) and may use the key to generate a cryptographic digital signature associated with boot software using a cryptographic algorithm. At power-on (or other early boot phase), the computing device may use its cryptographic key and the cryptographic algorithm (or a complementary algorithm) to verify the digital signature, thereby verifying the origin and integrity of the software before loading it for the next boot phase. Software of subsequent boot phases can employ similar techniques to create a verification chain proceeding to the end of the boot sequence and the runtime software. Thus, manufacturers and users of the computing device can be assured that the computing device is running the intended runtime software.

Conventional systems such as those described above face several challenges related to the integrity of the cryptosystems used for secure boot. A cryptographic key (e.g., the private key held by the manufacturer) may be lost, stolen, or otherwise compromised in a manner that potentially makes the secure boot sequence untrustworthy or unverifiable. As a result, the computing device may be unusable in applications where authenticity of the runtime software is critical. Furthermore, cryptographic algorithms have limited lifespans determined by available computational power and advances in cryptanalysis, among other factors. For example, classical computational power tends to increase at an exponential rate over time and can make brute force attacks against strong keys and algorithms plausible within a few years. Similarly, the advent of quantum computing may allow classically strong algorithms to be broken in a more reasonable period of time. As an additional example, discovery of new cryptanalysis techniques (e.g., the discovery of differential cryptanalysis and linear cryptanalysis in the 1980s and 1990s) may render seemingly strong cryptographic algorithms insecure. In applications where longevity of the computing device and its secure boot sequence is critical (e.g., in automotive, industrial, and infrastructure applications), it can be exceedingly difficult to identify cryptographic algorithms that can last for the lifecycle of the computing device (e.g., years or decades) and to protect cryptographic keys for the same length of time. Furthermore, in some situations, stronger cryptosystems (e.g., those having longer key lengths or more complex algorithms) may be more resource-intensive than weaker solutions (e.g., consuming more time, energy, silicon area, etc.). Manufacturers may choose a weaker cryptosystem with reduced longevity in order to satisfy the resource constraints of a given application.

As a result of these and other challenges, manufacturers and users may undertake costly mitigations or experience other impacts due to secure boot sequences that have been weakened or broken before the expected lifecycle of the associated computing devices has elapsed. For example, a manufacturer (e.g., of an automobile or industrial component) may issue an expensive and inconvenient recall of computing devices after a private key was stolen or a new cryptanalysis technique was announced. Such a recall may involve taping out new computing devices with new keys and/or algorithms embedded in the silicon and replacing the old devices. In some situations, a manufacturer may decide to update cryptographic algorithms and keys in a software phase of the secure boot sequence (e.g., using an over-the-air update). While this solution may be less costly than replacing computing devices, the boot phases that rely on the hardcoded cryptosystems may still be vulnerable. In another example conventional solution, a manufacturer and/or user may decide to accept additional risks associated with a weakened secure boot sequence (e.g., the potential for a future compromise) in lieu of a recall or similar solution. These conventional solutions may result in increased costs and liabilities to manufacturers, users, and other parties that rely on the integrity of secure boot sequences in computing devices.

Aspects of the present disclosure address the above and other deficiencies by providing cryptosystem migration for secure boot sequences. In at least one embodiment, a hierarchy of one or more cryptosystems is provided. A cryptosystem may refer to one or more cryptographic algorithms and one or more cryptographic keys associated with the algorithm(s), which may be used to provide a particular security service such as encrypting and decrypting data, signing and verifying cryptographic signatures, etc. The hierarchy of cryptosystems may include redundant cryptosystems with varying levels of resource consumption intensity, strength, trust, etc. The hierarchy of cryptosystems may be embedded in computing devices during manufacturing to facilitate a secure boot sequence. For example, each cryptosystem of the hierarchy may be enabled to authenticate a subsequent boot phase, or a proper subset of cryptosystems of the hierarchy may be enabled to authenticate a subsequent boot phase. Subsets of cryptosystems of the hierarchy may share the same cryptographic algorithms. Each cryptosystem may be associated with a priority in the hierarchy, such as a global/absolute priority or a priority relative to other cryptosystems on the hierarchy. The priority of a cryptosystem may be determined at or prior to manufacture and may be embedded in the computing device during manufacturing. For example, the relative priorities of two cryptosystems with different algorithms may be determined during the design of the computing device by comparing the relative strength, trustworthiness, or anticipated longevity of the two algorithms as known at design time (e.g., based on key length, resistance to cryptanalysis, recommendation of a standard-setting body, etc.). In another example, the absolute priorities of a set of cryptosystems with the same algorithm may be associated with indices in an ordered list of keys of the set.

In at least one embodiment, techniques for disabling cryptosystems of a secure boot sequence and migrating to alternative cryptosystems are provided. In an example scenario, a party (e.g., a manufacturer of a computing device, an end user of the computing device, or another party associated with the computing device) may determine that a cryptosystem currently used to authenticate a boot phase of the secure boot sequence is no longer trustworthy (e.g., due to a compromised key or an insecure algorithm). An instruction may be sent to the computing device (e.g., using an over-the-air update) to disable the untrustworthy cryptosystem such that an alternative trustworthy cryptosystem may instead be used for authenticating the boot phase. The sending of the instruction may be initiated by the party, by an automated system, etc. The instruction may be signed with a cryptographic signature corresponding to a cryptosystem on the computing device with a higher priority or trust level than the untrustworthy cryptosystem. The computing device may verify the cryptographic signature of the instruction and compare the priorities of the two cryptosystems to determine that the cryptosystem associated with the signature has a higher priority or trust level than the untrustworthy cryptosystem. The computing device may then disable the untrustworthy cryptosystem (e.g., by disabling the algorithm, the key, or both) so that it can no longer be used for authenticating the boot phase. For example, the computing device may program a one-time programmable bit to revoke a key or disable an algorithm.

Accordingly, computing devices using the techniques described herein can provide cryptosystem migration for secure boot sequences that enables cryptosystems to be disabled and switched out at low cost when a cryptosystem is determined to be no longer trustworthy (or for another reason). The availability of multiple redundant cryptosystems gives designers and manufacturers more room for error in predicting the longevity of individual cryptosystems. Designers and manufacturers may further prioritize resource efficiency of the computing device by using less resource-intensive and potentially weaker cryptosystems for the majority of a computing device's lifecycle and switching to a more resource-intensive cryptosystem in the event of a compromise. When a cryptosystem becomes untrustworthy, the disabling instruction may be initiated through a software update or similar remote process. Thus, the need for costly and inconvenient recalls and replacements may be reduced or eliminated, and parties may avoid the risks and liabilities associated with continuing to use an untrustworthy cryptosystem for the remainder of a computing device's lifecycle.

FIG. 1 is a block diagram of an example computing device 100 having a secure boot sequence in accordance with at least one embodiment. Computing device 100 (also referred to as "device" or "system" herein) may include a power supply 102, a processor 104, a cryptographic coprocessor 106, random-access memory (RAM) 108, nonvolatile memory 110, disk 112, network link 114, and removeable storage 116, any or each of which may be connected to system bus 118.

Computing device 100 may be (or may be included in) a desktop computer, a laptop computer, a smartphone, a tablet computer, a server, a microcontroller, an edge device, or any suitable computing device capable of performing the techniques described herein. In at least one embodiment, computing device 100 may be integrated into another device having a long lifecycle (e.g., years or decades). For example, computing device 100 may be integrated into an automobile or may be a controller device in an industrial or infrastructure application. In at least one embodiment, computing device 100 may have more or fewer components than those depicted in FIG. 1. For example, computing device 100 may include additional processors/cores or additional input/output peripherals such as a display, a touchscreen, a keyboard, or a mouse. In another example, computing device 100 may be a non-networked device and thus may not include network link 114. In some embodiments, computing device 100 may have integrated components while in other embodiments, computing device 100 may have discrete components. For example, computing device 100 may be a systemon-chip (SoC) with components integrated on the same wafer or circuit board. In another example, computing device may be a server, workstation, desktop or laptop computer, or other device with discrete components connected together with cables or other interfaces. In at least one embodiment, computing device 100 may include both discrete and integrated components. Further examples of computing devices are described with respect to FIG. 5.

Power supply 102 may supply one or more power levels to components of computing device 100. Power supply 102 may include a battery, an induction charger, a power cable, or other sources of power. Power supply 102 may further include a switch to activate or deactivate power to components. For example, power supply 102 may include a user button or switch, a relay, or a solid-state switch. Processor 104 and RAM 108 may store and execute data and operations in accordance with the techniques described herein. Further examples and descriptions of processors and RAM are described with respect to FIG. 5. System bus 118 may include one or more communication channels, each communication channel connecting one or more components of computing device 100. For example, system bus 118 may be a high-speed bus connecting the depicted components on a SoC. In another example, system bus 118 may include a Serial Peripheral Interface (SPI) bus for connecting some components to processor 104 (e.g., nonvolatile memory 110), a SATA bus for connecting other components (e.g., disk 112), and a PCIe bus for connecting yet other components (e.g., network link 114).

Cryptographic coprocessor 106 may be a specialized processor for performing operations associated with cryptographic algorithms supported by cryptographic coprocessor 106 (e.g., cryptographic algorithms 120). For example, cryptographic coprocessor 106 may include hardware blocks (circuitry, dedicated logic, IP blocks, etc.) for calculating hash functions or local read-only memory for storing look-up tables (e.g., S-boxes and P-boxes) associated with specific algorithms. Cryptographic coprocessor 106 may further include read-only or read-write memory to store cryptographic keys (e.g., cryptographic keys 122) that may be used for a secure boot sequence or for other purposes. Cryptographic algorithms 120 and cryptographic keys 122 may together be associated with a plurality of cryptosystems supported by cryptographic coprocessor 106. In at least one embodiment, multiple cryptosystems may use the same cryptographic algorithm, each with different cryptographic keys. Thus, cryptographic coprocessor 106 may associate multiple keys with an algorithm. This may be useful, for example, for providing alternate keys for a given algorithm if one or more keys are compromised (e.g., as described with respect to FIG. 3A). Each cryptosystem may be associated with a priority indicator (e.g., priority indicators 124) to determine its priority relative to other cryptosystems when used for a secure boot sequence, or for facilitating disabling of other cryptosystems and migrating to an alternative cryptosystem (e.g., for verifying a signed instruction to disable another cryptosystem). The priority of a cryptosystem may be determined at or prior to manufacture and may be embedded in the computing device during manufacturing. For example, the relative priorities of two cryptosystems with different algorithms may be determined during the design of the computing device by comparing the relative strength, trustworthiness, or anticipated longevity of the two algorithms as known at design time (e.g., based on key length, resistance to cryptanalysis, recommendation of a standard-setting body, etc.). In another example, the absolute priorities of a set of cryptosystems with the same algorithm may be associated with indices in an ordered list of keys of the set. Priority indicators 124 may correspond to bits in read-only or read-write memory of cryptographic coprocessor 106 or other logic implemented in hardware or software. Priorities of cryptosystems are further described with respect to FIGS. 3A-B. Cryptographic coprocessor 106 may include symmetrical or asymmetrical cryptosystems, classical or quantum-resistant cryptosystems, or other types and classifications of cryptosystems. Examples of algorithms used in cryptosystems include Digital Signature Algorithm (DSA), Elliptic Curve Digital Signature Algorithm (ECDSA), Rivest-Shamir-Adleman (RSA), Advanced Encryption Standard (AES), Data Encryption Standard (DES), Blowfish, CRYSTALS-Kyber, CRYSTALS-Dilithium, eXtended Merkle Signature Scheme (XMSS), Leighton-Micali Signatures (LMS), etc. Cryptographic coprocessor 106 may further include one-time programmable bits 125 (e.g., eFuses, write-once read-many memory), which may be used to disable or revoke one or more cryptosystems (e.g., a cryptographic key or a cryptographic algorithm and every associated key) and thus prevent the cryptosystem(s) from being used in a secure boot sequence. Disabling cryptosystems is further described with respect to FIG. 4. In some embodiments, cryptosystems of cryptographic coprocessor 106 may be used for any or every purpose (e.g., for a secure boot sequence and for facilitating disabling of or migration to other cryptosystems), while in other embodiments different cryptosystems may be limited to use for specific purposes (e.g., some may be used for a secure boot sequence and others may be used for facilitating disabling of or migration to other cryptosystems). In at least one embodiment, cryptographic coprocessor 106 may be included in processor 104 (e.g., in a processor with cryptographic extensions).

Nonvolatile memory 110 may be a read-only or read-write memory such as NOR or NAND flash, EEPROM, or similar. Nonvolatile memory 110 may include software such as firmware and drivers (e.g., firmware 126 and drivers 128) associated with a secure boot sequence of computing device 100. Nonvolatile memory may communicate with processor 104 and/or cryptographic coprocessor 106 using a communication protocol supported by hardware blocks of the processors (e.g., SPI, I2C, UART, or similar). In at least one embodiment, nonvolatile memory 110 may be included in processor 104 (e.g., in a microcontroller with embedded flash).

Disk 112 may be a read-only or read-write memory such as a magnetic disk drive, a magnetic tape, a solid-state drive, eMMC, or similar. Disk 112 may include runtime software such as an operating system or application (e.g., runtime software 130) that may be run at the completion of a secure boot sequence. Disk 112 may communicate with processor 104 and/or cryptographic coprocessor 106 using a communication protocol supported by software drivers (e.g., SATA, SCSI, USB, PCIe, NVMe, etc.).

Network link 114 may be an interface connecting computing device 100 with a network such as a local area network (LAN), wide area network (WAN), cellular network, or similar. Network link 114 may include an ethernet port, a wireless interface (e.g., Wi-Fi), a modem, or other networking technology. Network link 114 may be associated with drivers for communicating with other components (e.g., processor 104) and for supporting network protocols (e.g., IP, DHCP, UDP, TCP, etc.). Network link 114 may include or may provide access to runtime software 130. For example, runtime software may be accessed via network link 114 from network-attached storage (NAS), from a remote server, or similar. Network link 114 may receive disable instruction 132 (e.g., from a manufacturer), which may indicate (e.g., to processor 104 and/or cryptographic coprocessor 106) that a cryptosystem associated with a secure boot sequence should be disabled. Disable instructions are further described with respect to FIG. 4.

Removeable storage 116 may be a read-only or read-write memory such as a CD-ROM, a floppy disk, a USB flash drive, an SD card, or similar. Removeable storage 116 may include disable instruction 132 as described with respect to network link 114 and FIG. 4.

In at least one embodiment, firmware 126, drivers 128, runtime software 130, and disable instruction 132 may be associated with storage and communication media other than those depicted in FIG. 1. For example, disk 112 may include additional drivers 128 and removeable storage 116 may include runtime software 130 (e.g., a live CD). In at least one embodiment, components of computing device 100 may be associated with hardware drivers (e.g., hardware blocks) or software drivers other than those previously described by example. In at least one embodiment, computing device 100 may correspond to a virtual machine, containerized application, or other virtualization technology, and thus components of computing device 100 may correspond to virtualized, simulated, or emulated components.

FIG. 2 depicts a flow diagram of an example secure boot sequence 200 for computing devices, in accordance with at least one embodiment. Secure boot sequence 200 may be performed by processing logic that may comprise hardware (circuitry, dedicated logic, etc.), computer readable instructions such as software (run on a general-purpose computing system or a dedicated machine), or a combination of both. In at least one embodiment, secure boot sequence 200 is performed by computing device 100 or components thereof (e.g., processor 104, cryptographic coprocessor 106, runtime software 130). In at least one embodiment, secure boot sequence 200 is performed by computing system 500 of FIG. 5. It should be noted that blocks depicted in FIG. 2 (e.g., phases or stages of the secure boot sequence) could be performed simultaneously or in a different order than that depicted. Embodiments may include additional blocks not depicted in FIG. 2 or a subset of blocks depicted in FIG. 2.

At block 202, power is applied to a computing device. For example, with respect to computing device 100 of FIG. 1, power supply 102 may provide power to one or more components of computing device 100 in response to a user pressing a power button, a relay or solid-state switch being triggered remotely, or similar. In at least one embodiment, power may be applied at block 202 to a subset of components of the computing device, such as processor 104, cryptographic coprocessor 106, and nonvolatile memory 110. Other components may be powered up at a later time, e.g., after their respective drivers have been loaded. In at least one embodiment, components of the computing device may further regulate and distribute the applied power. For example, processor 104 may include one or more internal voltage regulators to supply one or more power rails.

At block 204, a processor of the computing device executes a hardcoded jump instruction to jump to firmware located in nonvolatile memory. For example, processor 104 of computing device 100 may execute a hardcoded (e.g., provided by dedicated circuitry or hardware logic) jump instruction to read firmware 126 from nonvolatile memory 110 using an SPI interface. In at least one embodiment, processor 104 may identify or load firmware without a hardcoded jump instruction.

At block 206, a cryptographic coprocessor of the computing device verifies a cryptographic signature of the firmware. For example, processor 104 may communicate with cryptographic coprocessor 106 to verify that firmware 126 is authentic and unmodified before beginning execution of firmware 126. Firmware 126 may include operations for processor 104 to execute, as well as one or more cryptographic signatures associated with the operations. The cryptographic signature(s) may be signed by the manufacturer or firmware developer with one or more private cryptographic keys using one or more digital signature algorithms (e.g., ECDSA) or other cryptographic algorithms. Cryptographic coprocessor 106 may include the corresponding public key (s) (e.g., in cryptographic keys 122) and complementary cryptographic algorithm(s) (e.g., in cryptographic algorithms 120) needed to verify the firmware signature(s). Cryptographic coprocessor 106 may determine the appropriate cryptosystem to use for verifying a signature by evaluating one-time programmable bits 125 (to ensure the cryptosystem is enabled), priority indicators 124, or other relevant considerations.

At block 208, if the cryptographic coprocessor identifies an available cryptosystem and verifies the cryptographic signature of the firmware with the cryptosystem, secure boot sequence 200 may proceed to execute the firmware at the next block. If the cryptographic coprocessor is unable to identify an available cryptosystem (e.g., every relevant cryptographic key of cryptographic keys 122 has been disabled by one-time programmable bits 125) or if the signature is invalid, secure boot sequence 200 may be aborted at block 224. Aborting secure boot sequence 200 may include powering off the computing device, restarting secure boot sequence 200 and trying again, loading alternative firmware (e.g., diagnostic firmware), or other options.

At block 210, the processor executes a firmware instruction to load drivers located in nonvolatile memory. For example, an operation of firmware 126 may instruct processor 104 to load one or more drivers 128 from nonvolatile memory 110. Drivers 128, once loaded, may enable processor 104 to communicate with and use other components of computing device 100 in subsequent phases of the secure boot sequence (e.g., RAM 108, disk 112, network link 114, removeable storage 116).

At block 212, the cryptographic coprocessor verifies cryptographic signatures of the drivers. As described with respect to block 206, processor 104 may communicate with cryptographic coprocessor 106 to verify that drivers 128 are authentic and unmodified before beginning using drivers 128. In various embodiments, cryptographic coprocessor 106 may use the same or different cryptosystems to verify drivers 128 as were used to verify firmware 126 in block 206 (e.g., different clusters in a cryptosystem hierarchy as described with respect to FIG. 3B). As before, cryptographic coprocessor 106 may determine the appropriate cryptosystem to use for verifying a signature by evaluating one-time programmable bits 125 (to ensure the cryptosystem is enabled), priority indicators 124, or other relevant considerations.

At block 214, if the cryptographic coprocessor identifies available cryptosystems and verifies the cryptographic signatures of the drivers with the cryptosystems, secure boot sequence 200 may proceed to use the drivers at the next block. If the cryptographic coprocessor is unable to identify available cryptosystems (e.g., every relevant cryptographic key of cryptographic keys 122 has been disabled by one-time programmable bits 125) or if the signatures are invalid, secure boot sequence 200 may be aborted at block 224 as before.

At block 216, the processor executes a firmware instruction to load runtime software located on disk using the drivers. For example, an operation of firmware 126 may instruct processor 104 to load runtime software 130 from disk 112.

At block 218, the cryptographic coprocessor verifies a cryptographic signature of the runtime software. As described with respect to blocks 206 and 212, processor 104 may communicate with cryptographic coprocessor 106 to verify that runtime software 130 is authentic and unmodified before beginning execution of runtime software 130. In various embodiments, cryptographic coprocessor 106 may use the same or different cryptosystems to verify runtime software 130 as were used to verify firmware 126 in block 206 and/or drivers 128 in block 212. As before, cryptographic coprocessor 106 may determine the appropriate cryptosystem to use for verifying a signature by evaluating one-time programmable bits 125 (to ensure the cryptosystem is enabled), priority indicators 124, or other relevant considerations.

At block 220, if the cryptographic coprocessor identifies an available cryptosystem and verifies the cryptographic signature of the runtime software with the cryptosystem, secure boot sequence 200 may proceed to execute the runtime software at block 222 (e.g., using processor 104). If the cryptographic coprocessor is unable to identify an available cryptosystem (e.g., every relevant cryptographic key of cryptographic keys 122 has been disabled by one-time programmable bits 125) or if the signature is invalid, secure boot sequence 200 may be aborted at block 224 as before. In at least one embodiment, an abort at block 220 may include loading alternative runtime software (e.g., diagnostic software, an administrator mode, etc.).

In at least one embodiment, secure boot sequence 200 may include fewer phases than those depicted in FIG. 2. For example, drivers 128 may be included in firmware 126 and thus may not need to be loaded and verified in separate phases. In another example, different applications may require that different subsets of phases are cryptographically verified (e.g., the firmware and drivers are verified but not the runtime software).

In at least one embodiment, secure boot sequence 200 may include additional phases not depicted in FIG. 2. For example, computing device 100 may include a plurality of processors, with simpler processors being used to boot increasingly complex processors in a chain. In such cases, each processor may be associated with separate firmware and drivers which may or may not require cryptographic verification. Processors may share a cryptographic coprocessor or may each have a dedicated cryptographic coprocessor. In another example, the runtime software may be a second-stage bootloader (e.g., GRUB, rEFInd, BOOTMGR), which may execute additional boot phases and load additional drivers before executing a second runtime software (e.g., an operating system or yet another bootloader). In such cases, the second-stage bootloader may or may not cryptographically verify additional software components as previously described.

In at least one embodiment, signature verification phases of secure boot sequence 200 may include verifying a plurality of cryptographic signatures. For example, firmware 126, drivers 128, and/or runtime software 130 may each be signed with a plurality of cryptographic signatures and may require cryptographic coprocessor 106 to verify every signature before continuing secure boot sequence 200. The plurality of signatures may be associated with a plurality of parties (e.g., designer, manufacturer, end user, etc.) or a plurality of different cryptographic algorithms.

Figure 3A:
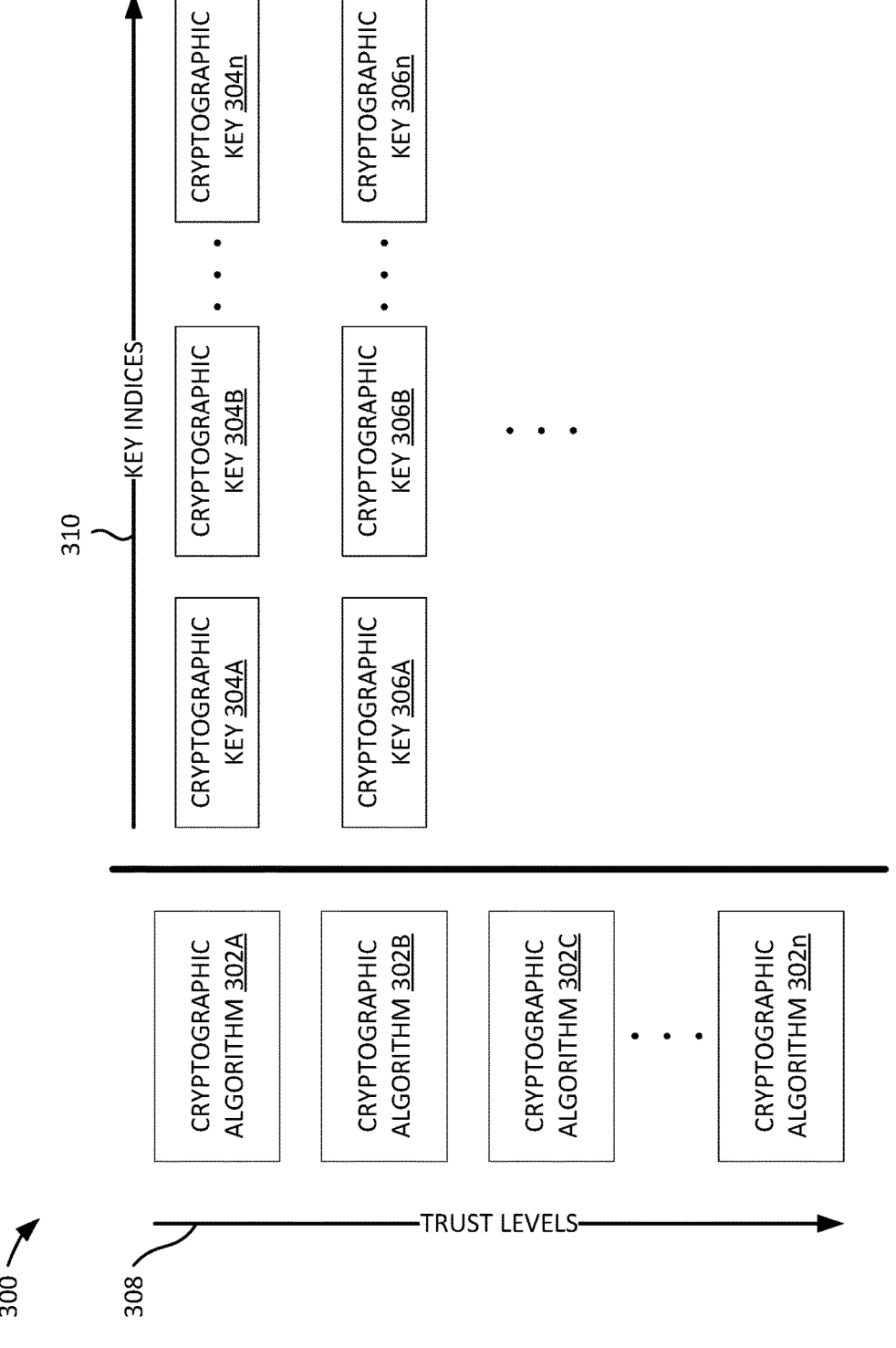
FIGS. 3A-B are block diagrams of example cryptosystem hierarchies of a computing device having a secure boot sequence in accordance with at least one embodiment.

FIG. 3A is a block diagram of an example cryptosystem hierarchy 300 of a computing device having a secure boot sequence in accordance with at least one embodiment. Cryptosystem hierarchy 300 includes a plurality of cryptosystems comprising cryptographic algorithms 302A-n and associated cryptographic keys (cryptographic keys 304A-n and 306A-n shown). As described with respect to FIG. 1, cryptosystem hierarchy 300 and components thereof may correspond to hardware blocks (e.g., dedicated logic, look-up tables, ROM, etc.) in a cryptographic coprocessor of a computing device. For example, cryptographic algorithms 302A-n may correspond to cryptographic algorithms 120 of cryptographic coprocessor 106, cryptographic keys 304A-n and 306A-n may correspond to cryptographic keys 122, and trust levels 308 and key indices 310 may correspond to priority indicators 124. Cryptosystem hierarchy 300 and components thereof may also correspond to software (e.g., firmware or microcode implementations of hierarchy 300), or to a combination of hardware and software in various embodiments.

In at least one embodiment, cryptographic algorithms 302A-n may correspond to different algorithms (e.g., algorithms of different types such as DSA, ECDSA, etc.) and/or different key lengths of a given algorithm (e.g., 2048-bit and 4096-bit RSA). Cryptographic algorithms 302A-n may each be associated with a level of trust or other priority level relative to other cryptographic algorithms or relative to a global hierarchy scale. For example, trust levels 308 of FIG. 3A are depicted as a descending scale such that algorithm 302A is more trusted than 302B, 302B is more trusted than 302C, etc. Algorithms with higher levels of trust may supersede algorithms with lower levels of trust for the purposes of secure boot verification, facilitating disabling of the lower-trust algorithms/keys, etc. In at least one embodiment, one algorithm may be enabled at a time for the purposes of secure boot verification, facilitating disabling of other algorithms/keys, etc. For example, algorithm 302C may be enabled for these purposes, while 302A-B are disabled. Should algorithm 302C become disabled as described with respect to FIG. 4, algorithm 302B may become the new active algorithm. In at least one embodiment, every algorithm may be enabled for various purposes by default unless disabled as described with respect to FIG. 4.

In at least one embodiment, trust levels for cryptographic algorithms 302A-n and the number of cryptographic algorithms provided may be determined during the design phase of the computing device or at manufacturing (e.g., tape-out) of the computing device. Designers, manufacturers, or other parties may evaluate cryptographic algorithms available at that time and may make predictions about algorithm strength, longevity, and other characteristics for the expected lifecycle of the computing device in order to determine relative or absolute levels of trust and how many algorithms may be needed for a particular application. Parties may further consult local or global regulations, standards, or recommendations from, e.g., universities, cryptographic standards organizations, or government agencies to determine levels of trust for cryptographic algorithms. The determined levels of trust may be stored in, e.g., a cryptographic coprocessor in a read-only or read-write memory which the cryptographic coprocessor (or other processor) may evaluate when comparing priority levels of two algorithms. In at least one embodiment, the levels of trust may be static (e.g., in a read-only memory), which may prevent unintended modification of the trust hierarchy during the lifecycle of the computing device. In at least one embodiment, the levels of trust may be modified during the lifecycle of the computing device (e.g., in a read-write memory), which may enable the trust hierarchy to be updated in light of new cryptanalysis research, new standards and recommendations, etc. A cryptographic key (e.g., one of the keys depicted in FIG. 3A or an additional key not depicted) may be required for authentication before the trust hierarchy can be modified.

In at least one embodiment, cryptographic algorithms 302A-n may each be associated with one or more cryptographic keys in one or more corresponding cryptosystems. For example, cryptographic keys 304A-n may be used with cryptographic algorithm 302A for cryptographic verification of a secure booting process or for facilitating disabling of other cryptographic algorithms/keys, cryptographic keys 306A-n may be used with cryptographic algorithm 302B, and so on. Different algorithms may be associated with different numbers of keys. Cryptographic keys 304A-n, (and 306A-n, etc.) may each be associated with an index in an ordered or unordered list of the keys of algorithm 302A (and 302B, etc.). For example, key indices 310 of FIG. 3A are depicted as ascending (or descending) from left to right such that key 304A has a lower (or higher) index than key 304B, 304B has a lower (or higher) index than the next key, etc. Keys with lower (or higher) indices may supersede keys with higher (or lower) indices for the purposes of secure boot verification, facilitating disabling of other algorithms/ keys, etc. In at least one embodiment, one key per algorithm may be enabled at a time for the purposes of secure boot verification, facilitating disabling of other algorithms/keys, etc. For example, keys 304A and 306A may be enabled for their respective algorithms, while 304B-n and 306B-n are disabled. Should key 304 become disabled as described with respect to FIG. 4, key 306B may become the new active key for the respective algorithm. In at least one embodiment, every key for a given algorithm may be enabled for various purposes by default unless disabled as described with respect to FIG. 4.

In at least one embodiment, a sufficient number of cryptographic keys may be provided for each of one or more algorithms based on the needs of a particular application. For example, a designer, manufacturer, etc. may estimate how many keys are expected to be compromised during the lifecycle of the computing device and may provide at least that many keys for each algorithm. Similarly, a party may decide to retire keys on a routine basis (e.g., monthly, annually, every 5 years, etc.) and may provide enough keys for each algorithm to last the lifecycle of the computing device with the chosen retirement schedule.

Figure 3B:
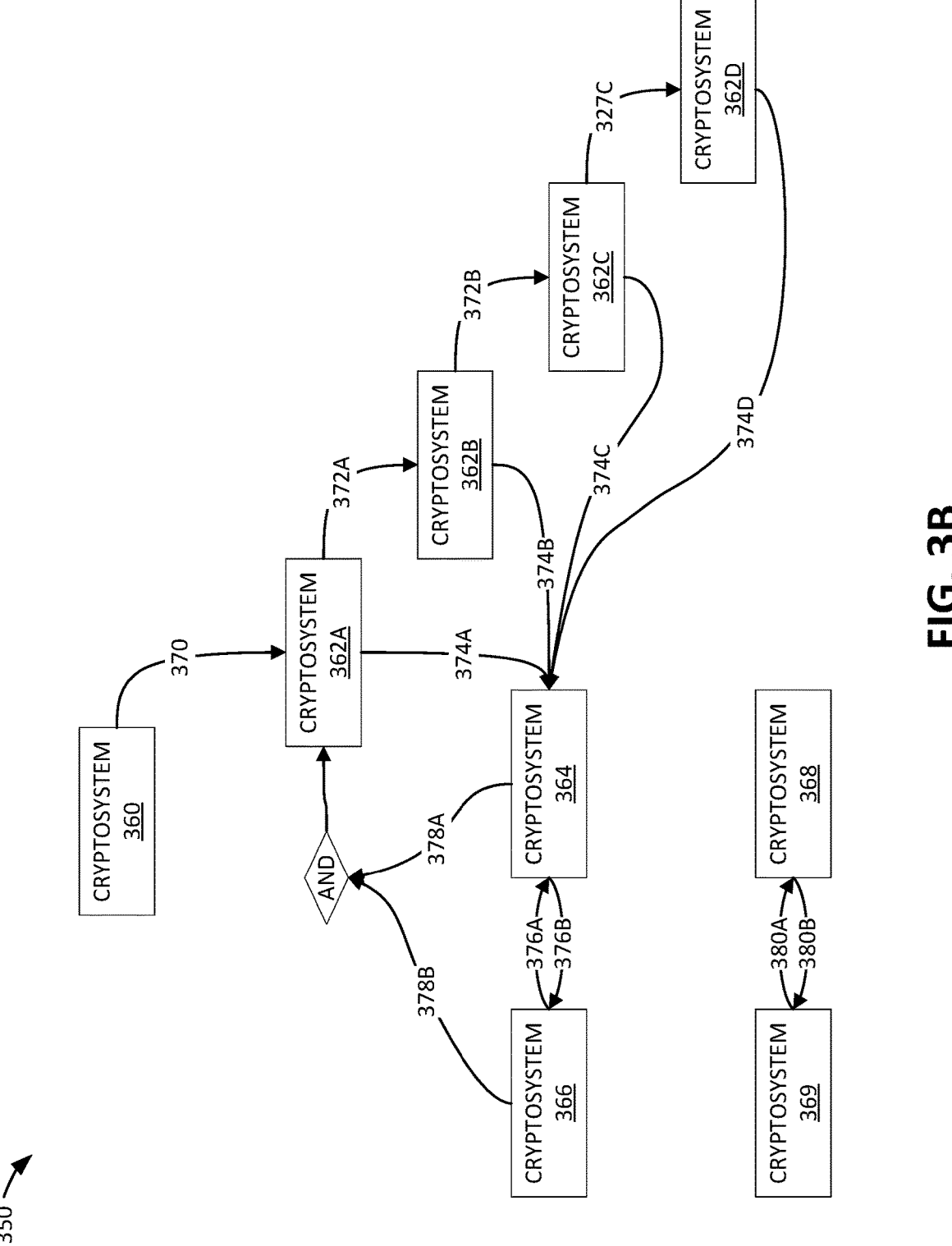

FIG. 3B is a block diagram of an additional example cryptosystem hierarchy 350 of a computing device having a secure boot sequence in accordance with at least one embodiment. Cryptosystem hierarchy 350 includes a plurality of cryptosystems 360-369 each comprising a cryptographic algorithm and a cryptographic key (algorithms and keys not depicted), and each being associated with one or more priority indicators 370-380 (depicted as directed edges). As previously described, the priority indicators may be determined at or prior to manufacture and may be based on the relative strength, trustworthiness, anticipated longevity, etc. of two algorithms as known at or before design time. The priority indicators may also be based on an ordering of cryptographic keys or other ordering technique. As described with respect to FIGS. 1 and 3A, cryptosystem hierarchy 350 and components thereof may correspond to hardware blocks in a cryptographic coprocessor of a computing device. For example, cryptographic algorithms of cryptosystems 360-369 may correspond to cryptographic algorithms 120 of cryptographic coprocessor 106, cryptographic keys of cryptosystems 360-369 may correspond to cryptographic keys 122, and priority indicators 370-380 may correspond to priority indicators 124.

In at least one embodiment, a first cryptosystem may be used to disable a second cryptosystem in response to a disable instruction (as described with respect to FIG. 4) if the first cryptosystem's priority indicator supersedes the second cryptosystem's priority indicator. As described with respect to FIG. 3A, priority indicators may correspond to trust levels of algorithms, indices of keys in lists, or other relative or absolute ranks. For example, cryptosystems 360 and 362A may each be associated with a different cryptographic algorithm, with the algorithm of cryptosystem 360 having a higher level of trust corresponding to priority indicator 370. This example may correspond to trust levels 308 described with respect to FIG. 3A. As an additional example, cryptosystems 362A-D may each be associated with the same cryptographic algorithm and different keys, with cryptosystem 362A having a lower index in an ordered list (corresponding to priority indicators 372A-C) than cryptosystem 362D. This example may correspond to key indices 310 described with respect to FIG. 3A. In at least one embodiment, a cryptosystem may be used to disable any cryptosystem with a lower priority, such as any cryptosystem that can be reached by following a chain of priority indicators 370-380. In at least one embodiment, a cryptosystem may be used to disable adjacent cryptosystems (e.g., one priority indicator away) but may be unable to disable distant cryptosystems (e.g., two or more priority indicators away).

Cryptosystem hierarchy 350 further includes examples of close loops of priority indicators and open chains of priority indicators. An example of a closed loop of priority indicators is depicted with respect to cryptosystems 364 and 366. Priority indicators 376A-B indicate that either cryptosystem may be used, e.g., to disable the other. This closed loop may be useful, for example, if both cryptosystems share the same algorithm or use algorithms with similar trust, and further if both cryptosystems are similarly likely to be compromised. One or both cryptosystems may be used for the secure boot sequence, and either can be disabled when compromised. Larger loops may be used, e.g., priority indicators 372A-374B-378A-B. An example of an open chain of priority indicators is depicted with respect to cryptosystem 360 and 362A. Priority indicator 370 indicates that cryptosystem 360 may be used, e.g., to disable cryptosystem 362A, but the opposite is not true. This open chain may be useful, for example, if cryptosystem 360 is known to be more trustworthy than cryptosystem 362A, but cryptosystem 360 is also more resource-intensive than cryptosystem 362A. Cryptosystem 362A may be used for the secure boot sequence during the initial part of the computing device's lifecycle, and cryptosystem 360 may disable cryptosystem 362A and continue facilitating the secure boot sequence in the event that cryptosystem 362A is compromised.

In at least one embodiment, a plurality of cryptosystems may be required to disable another cryptosystem. For example, cryptosystems 364 and 366 may have sufficient combined priority (via priority indicators 378A-B) to disable cryptosystem 362A. In this example, a disable instruction (e.g., disable instruction 132 of FIG. 1) may be cryptographically signed and verified using both cryptosystems 364 and 366 in order to disable cryptosystem 362A. This may be useful, for example, for providing a way to disable a more trusted algorithm using two less trusted algorithms that are sufficiently different (e.g., one symmetric and one asymmetric) to decrease the likelihood that both will be compromised and thus increase their combined trust. Other more complex procedures for disabling a cryptosystem using one or more cryptosystems are within the spirit and scope of the present disclosure.

Cryptosystem hierarchy 350 further includes examples of independent clusters of cryptosystems and priority indicators. For example, cryptosystems 360-366 form a first cluster with priority indicators 370-378, and cryptosystems 368-369 form a second cluster with priority indicators 380A-B. A cryptosystem may be able to disable another cryptosystem in the same cluster using the techniques previously described, while a cryptosystem may be unable to disable another cryptosystem in a different cluster. This may be useful, for example, for providing different clusters for different phases of the secure boot sequence. In this example, the first cluster may be used for verifying firmware and drivers, and the second cluster may be used for verifying runtime software.

FIG. 4 depicts a flow diagram of an example method 400 for disabling cryptosystems of a computing device having a secure boot sequence and providing cryptosystem migration, in accordance with at least one embodiment. Method 400 may be performed by processing logic that may comprise hardware (circuitry, dedicated logic, etc.), computer readable instructions such as software (run on a general-purpose computing system or a dedicated machine), or a combination of both. In at least one embodiment, method 400 is performed by computing device 100 or components thereof (e.g., processor 104, cryptographic coprocessor 106, runtime software 130). In at least one embodiment, method 400 is performed by runtime software 130 of computing device 100 after completion of secure boot sequence 200 of FIG. 2. In at least one embodiment, method 400 is performed by computing system 500 of FIG. 5. It should be noted that blocks depicted in FIG. 4 could be performed simultaneously or in a different order than that depicted. Embodiments may include additional blocks not depicted in FIG. 4 or a subset of blocks depicted in FIG. 4.

At block 402, processing logic of a computing device receives an instruction to disable a first cryptographic key embedded in the device during manufacturing to facilitate a boot sequence of the device, wherein the instruction is signed using a cryptographic signature, and wherein the first cryptographic key is associated with a first priority indicator. In at least one embodiment, the instruction may be disable instruction 132, the first cryptographic key may be one of cryptographic keys 122 and/or cryptographic keys 304A-n and 306A-n, and the first priority indicator may be one of priority indicators 124, trust levels 308, key indices 310, and/or priority indicators 370-380. The instruction may be received, for example, from network link 114 (e.g., from a remote server or similar) or removable storage 116 (e.g., a USB flash drive).

In at least one embodiment, the instruction may be received in response to determining that a cryptosystem (a cryptographic key or algorithm) has been compromised or is no longer trustworthy, recommended, etc. For example, a designer, manufacturer, etc. may determine that a key has been lost or stolen, or that a cryptographic algorithm has been weakened. In another example, a university, cryptographic standards organization, government agency, or other body may determine that the cryptosystem has a security vulnerability, is no longer recommended, or is being removed from a standard or regulation. The instruction may also be received in response to a determination to retire a cryptographic key, such as on a periodic basis. In at least one embodiment, the instruction may be an instruction to disable a first cryptosystem embedded in the device, which may comprise disabling the first cryptographic key, disabling a cryptographic set of operations (e.g., a cryptographic algorithm), disabling a plurality of cryptographic keys (e.g., each corresponding to the same algorithm), or a combination thereof.

In at least one embodiment, the boot sequence comprises a first boot stage and a second boot stage, wherein the first cryptographic key was embedded in the device to authenticate the second boot stage during the first boot stage, and wherein the instruction to disable the first cryptographic key is received after the first boot stage from software associated with the second boot stage. For example, the first boot stage may be a phase of secure boot sequence 200 (e.g., blocks 212-214 or blocks 218-220) and the second boot stage may be another phase of secure boot sequence 200 (e.g., block 216 or block 222). In another example, the first boot stage may be secure boot sequence 200 and the second boot stage and associated software may be an operating system or second-stage bootloader executing after block 222. The first cryptographic key may be used to verify or authenticate subsequent phases or stages as described with respect to FIG. 2. The instruction to disable the first cryptographic key may be received from the operating system (or other runtime software) at processor 104 or cryptographic coprocessor 106, for example. In another example, the operating system may receive the instruction from an over-the-air update (e.g., via network link 114), from an update on removeable storage 116, or through some other communication channel.

In at least one embodiment, the second cryptographic key was embedded in the device during manufacturing to facilitate the boot sequence of the device. For example, either the first cryptographic key or the second cryptographic key may be used for verifying firmware, drivers, runtime software, etc. associated with the boot sequence. In at least one embodiment, the second cryptographic key was embedded in the device for disabling the first or other cryptographic key(s). For example, the second cryptographic key may be disabled or otherwise unavailable for the purpose of verifying firmware/software for the boot sequence.

At block 404, the processing logic verifies the cryptographic signature using a second cryptographic key embedded in the device during manufacturing, wherein the second cryptographic key is associated with a second priority indicator. In at least one embodiment, the second cryptographic key may be one of cryptographic keys 122 and/or cryptographic keys 304A-n and 306A-n, and the second priority indicator may be one of priority indicators 124, trust levels 308, key indices 310, and/or priority indicators 370-380.

In at least one embodiment, the first priority indicator and the second priority indicator may correspond to indices in an ordered list of cryptographic keys associated with a cryptographic set of operations. For example, the first and second priority indicators may correspond to indices of key indices 310 and the ordered list of cryptographic keys may correspond to keys of cryptographic keys 304A-n associated with cryptographic algorithm 302A. In at least one embodiment, the first cryptographic key is a compromised (e.g., lost, stolen) or a retired key.

In at least one embodiment, the first cryptographic key is associated with a first cryptographic set of operations and the second cryptographic key is associated with a second cryptographic set of operations. For example, the first cryptographic set of operations may be cryptographic algorithm 302A, and the second cryptographic set of operations may be cryptographic algorithm 302B. The first cryptographic key may be one of cryptographic keys 304A-n, and the second cryptographic key may be one of cryptographic keys 306A-n. The first cryptographic set of operations may be associated with a first resource consumption intensity metric (e.g., power consumption, speed, latency, bandwidth, silicon area, etc.) and the second cryptographic set of operations may be associated with a second resource consumption intensity metric. The resource consumption intensity metrics may be determined based on design analysis, simulation, experimental testing, intrinsic properties of the respective cryptographic set of operations (e.g., computational complexity), etc. The second resource consumption intensity metric may be greater than the first resource consumption intensity metric (e.g., higher power consumption, slower speed, higher latency, lower bandwidth, higher silicon area, etc.). In at least one embodiment, the first priority indicator corresponds to a trust level of the first cryptographic set of operations and the second priority indicator corresponds to a trust level of the second cryptographic set of operations. For example, the first and second cryptographic sets of operations may correspond to trust levels of trust levels 308. The second cryptographic set of operations may be associated with a higher level of trust than the second cryptographic set of operations. In at least one embodiment, the first cryptographic set of operations is associated with a security vulnerability determination of a cryptographic standards organization (or other determination/recommendation of another organization/body as previously described).

At block 406, the processing logic compares the first priority indicator with the second priority indicator. Processing logic may determine that one priority indicator is greater, lesser, or otherwise supersedes the other priority indicator.

At block 408, responsive to determining that the second priority indicator supersedes the first priority indicator, the processing logic disables the first cryptographic key. In at least one embodiment, disabling the first cryptographic key comprises programming a one-time programmable revocation bit associated with the first cryptographic key. In at least one embodiment, the processing logic may program a plurality of one-time programmable bits to disable a plurality of keys associated with a lower-trust cryptographic set of operations. In at least one embodiment, the processing logic may program a one-time programmable bit to disable a lower-trust cryptographic set of operations. In at least one embodiment, disabling cryptographic keys and/or cryptographic sets of operations may comprise programming and read-write revocation bit such that the cryptographic keys and/or cryptographic sets of operations may be reenabled again.

Figure 5:
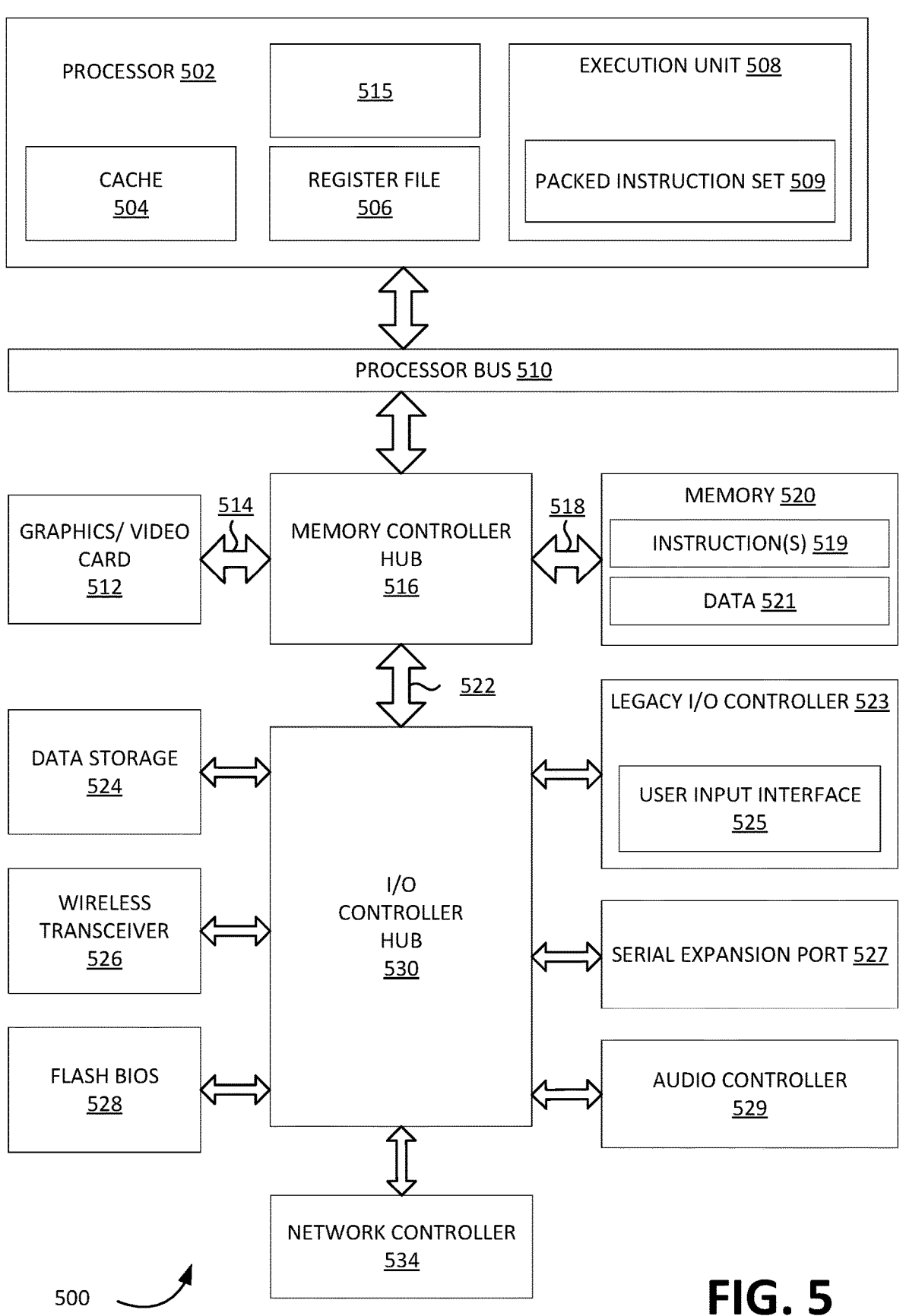
FIG. 5 illustrates a computer system, according to at least one embodiment.

FIG. 5 is a block diagram illustrating an exemplary computer system, which may be a system with interconnected devices and components, a system-on-a-chip (SOC) or some combination thereof 500 formed with a processor that may include execution units to execute an instruction, according to at least one embodiment. In at least one embodiment, computer system 500 may include, without limitation, a component, such as a processor 502 to employ execution units including logic to perform algorithms for process data, in accordance with present disclosure, such as in embodiment described herein. In at least one embodiment, computer system 500 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 500 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 500 may include, without limitation, processor 502 that may include, without limitation, one or more execution units 508 to perform machine learning model training and/or inferencing according to techniques described herein. In at least one embodiment, computer system 500 is a single processor desktop or server system, but in another embodiment computer system 500 may be a multiprocessor system. In at least one embodiment, processor 502 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 502 may be coupled to a processor bus 510 that may transmit data signals between processor 502 and other components in computer system 500.

In at least one embodiment, processor 502 may include, without limitation, a Level 1 ("L1") internal cache memory ("cache") 504. In at least one embodiment, processor 502 may have a single internal cache or multiple levels of internal cache. In at least one embodiment, cache memory may reside external to processor 502. Other embodiments may also include a combination of both internal and external caches depending on particular implementation and needs. In at least one embodiment, register file 506 may store different types of data in various registers including, without limitation, integer registers, floating point registers, status registers, and instruction pointer register.

In at least one embodiment, execution unit 508, including, without limitation, logic to perform integer and floating-point operations, also resides in processor 502. In at least one embodiment, processor 502 may also include a micro-code ("ucode") read-only memory ("ROM") that stores microcode for certain macro instructions. In at least one embodiment, execution unit 508 may include logic to handle a packed instruction set 509. In at least one embodiment, by including packed instruction set 509 in an instruction set of a general-purpose processor 502, along with associated circuitry to execute instructions, operations used by many multimedia applications may be performed using packed data in a general-purpose processor 502. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 508 may also be used in microcontrollers, embedded processors, graphics devices, DSPs, and other types of logic circuits. In at least one embodiment, computer system 500 may include, without limitation, a memory 520. In at least one embodiment, memory 520 may be implemented as a Dynamic Random Access Memory ("DRAM") device, a Static Random Access Memory ("SRAM") device, flash memory device, or other memory device. In at least one embodiment, memory 520 may store instruction(s) 519 and/or data 521 represented by data signals that may be executed by processor 502.

In at least one embodiment, system logic chip may be coupled to processor bus 510 and memory 520. In at least one embodiment, system logic chip may include, without limitation, a memory controller hub ("MCH") 516, and processor 502 may communicate with MCH 516 via processor bus 510. In at least one embodiment, MCH 516 may provide a high bandwidth memory path 518 to memory 520 for instruction and data storage and for storage of graphics commands, data and textures. In at least one embodiment, MCH 516 may direct data signals between processor 502, memory 520, and other components in computer system 500 and to bridge data signals between processor bus 510, memory 520, and a system I/O 522. In at least one embodiment, system logic chip may provide a graphics port for coupling to a graphics controller. In at least one embodiment, MCH 516 may be coupled to memory 520 through a high bandwidth memory path 518 and graphics/video card 512 may be coupled to MCH 516 through an Accelerated Graphics Port ("AGP") interconnect 514.

In at least one embodiment, computer system 500 may use system I/O 522 that is a proprietary hub interface bus to couple MCH 516 to I/O controller hub ("ICH") 530. In at least one embodiment, ICH 530 may provide direct connections to some I/O devices via a local I/O bus. In at least one embodiment, local I/O bus may include, without limitation, a high-speed I/O bus for connecting peripherals to memory 520, chipset, and processor 502. Examples may include, without limitation, an audio controller 529, a firmware hub ("flash BIOS") 528, a wireless transceiver 526, a data storage 524, a legacy I/O controller 523 containing user input and keyboard interfaces 525, a serial expansion port 527, such as Universal Serial Bus ("USB"), and a network controller 534, which may include in some embodiments, a data processing unit. Data storage 524 may comprise a hard disk drive, a floppy disk drive, a CD-ROM device, a flash memory device, or other mass storage device.

In at least one embodiment, FIG. 5 illustrates a system, which includes interconnected hardware devices or "chips," whereas in other embodiments, FIG. 5 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 500 are interconnected using compute express link (CXL) interconnects.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   receiving, by a processor of a device, an instruction to disable a first cryptographic key embedded in the device during manufacturing to facilitate a boot sequence of the device, wherein:
      the boot sequence comprises a first boot stage and a second boot stage,
      the instruction is received after the first boot stage from software associated with the second boot stage,
      the first cryptographic key was embedded in the device to authenticate the second boot stage during the first boot stage, the instruction is signed using a cryptographic signature, and the first cryptographic key is associated with a first priority indicator;

verifying the cryptographic signature using a second cryptographic key embedded in the device during manufacturing, wherein the second cryptographic key is associated with a second priority indicator;

comparing the first priority indicator with the second priority indicator; and responsive to determining that the second priority indicator supersedes the first priority indicator, disabling the first cryptographic key.

2. The method of claim 1, wherein the first priority indicator and the second priority indicator correspond to indices in an ordered list of cryptographic keys associated with a cryptographic set of operations.

3. The method of claim 2, wherein the first cryptographic key is a compromised cryptographic key.

4. The method of claim 1, wherein the first cryptographic key is associated with a first cryptographic set of operations and the second cryptographic key is associated with a second cryptographic set of operations.

5. The method of claim 4, wherein the first cryptographic set of operations is associated with a first resource consumption intensity metric and the second cryptographic set of operations is associated with a second resource consumption intensity metric, and wherein the second resource consumption intensity metric is greater than the first resource consumption intensity metric.

6. The method of claim 4, wherein the first priority indicator corresponds to a trust level of the first cryptographic set of operations and the second priority indicator corresponds to a trust level of the second cryptographic set of operations.

7. The method of claim 6, wherein the first cryptographic set of operations is associated with a security vulnerability determination of a cryptographic standards organization.

8. The method of claim 1, wherein disabling the first cryptographic key comprises programming a one-time programmable revocation bit associated with the first cryptographic key.

9. The method of claim 1, wherein the instruction is received via an over-the-air update associated with the software.

10. The method of claim 1, wherein the second cryptographic key was embedded in the device during manufacturing to facilitate the boot sequence of the device.

11. A system comprising:

a memory; and one or more processing units coupled to the memory, the one or more processing units to:

receive an instruction to disable a first cryptographic key embedded in the system during manufacturing to facilitate a boot sequence of the system, wherein:

the boot sequence comprises a first boot stage and a second boot stage, the instruction is received after the first boot stage from software associated with the second boot stage, the first cryptographic key was embedded in the system to authenticate the second boot stage during the first boot stage, the instruction is signed using a cryptographic signature, and the first cryptographic key is associated with a first priority indicator;

verify the cryptographic signature using a second cryptographic key embedded in the system during manufacturing, wherein the second cryptographic key is associated with a second priority indicator;

compare the first priority indicator with the second priority indicator; and responsive to determining that the second priority indicator supersedes the first priority indicator, disable the first cryptographic key.

12. The system of claim 11, wherein the first priority indicator and the second priority indicator correspond to indices in an ordered list of cryptographic keys associated with a cryptographic set of operations.

13. The system of claim 12, wherein the first cryptographic key is a compromised cryptographic key.

14. The system of claim 11, wherein the instruction is received via an over-the-air update associated with the software.

15. The system of claim 11, wherein the second cryptographic key was embedded in the system during manufacturing to facilitate the boot sequence of the system.

16. A non-transitory computer-readable storage medium comprising instructions that, when executed by a processing device, cause the processing device to perform operations comprising:

receiving an instruction to disable a first cryptographic key embedded in the processing device during manufacturing to facilitate a boot sequence of the processing device, wherein:

the boot sequence comprises a first boot stage and a second boot stage, the instruction is received after the first boot stage from software associated with the second boot stage, the first cryptographic key was embedded in the processing device to authenticate the second boot stage during the first boot stage, the instruction is signed using a cryptographic signature, and the first cryptographic key is associated with a first priority indicator;

verifying the cryptographic signature using a second cryptographic key embedded in the processing device during manufacturing, wherein the second cryptographic key is associated with a second priority indicator;

comparing the first priority indicator with the second priority indicator; and responsive to determining that the second priority indicator supersedes the first priority indicator, disabling the first cryptographic key.

17. The non-transitory computer-readable storage medium of claim 16, wherein the first cryptographic key is associated with a first cryptographic set of operations and the second cryptographic key is associated with a second cryptographic set of operations.

18. The non-transitory computer-readable storage medium of claim 17, wherein the first cryptographic set of operations is associated with a first resource consumption intensity metric and the second cryptographic set of operations is associated with a second resource consumption intensity metric, and wherein the second resource consumption intensity metric is greater than the first resource consumption intensity metric.

19. The non-transitory computer-readable storage medium of claim 17, wherein the first priority indicator corresponds to a trust level of the first cryptographic set of operations and the second priority indicator corresponds to a trust level of the second cryptographic set of operations.

20. The non-transitory computer-readable storage medium of claim 19, wherein the first cryptographic set of operations is associated with a security vulnerability determination of a cryptographic standards organization.

* * * * *